United States Patent [19]

Horner et al.

[11] Patent Number: 5,279,909
[45] Date of Patent: Jan. 18, 1994

[54] COMPACT MULTILAYER CERAMIC-TO-METAL SEAL STRUCTURE

[75] Inventors: M. Harlan Horner; Emilio M. Giraldez, both of Del Mar, Calif.

[73] Assignee: General Atomics, San Diego, Calif.

[21] Appl. No.: 877,837

[22] Filed: May 1, 1992

[51] Int. Cl.$^5$ ............................................. H01M 2/08
[52] U.S. Cl. ..................... 429/184; 429/174; 29/623.2; 228/170; 228/173.2
[58] Field of Search ............. 429/174, 181, 184; 228/122, 170, 173.2; 428/547, 565; 29/623.2, 623.3

[56] References Cited

U.S. PATENT DOCUMENTS

| | | | |
|---|---|---|---|
| 3,148,981 | 9/1964 | Ryshkewitch | 428/547 X |
| 3,324,543 | 6/1967 | McVey et al. | 29/472.9 |
| 3,719,479 | 3/1973 | Flanagan | 428/547 X |
| 3,960,596 | 6/1976 | Mitoff et al. | 136/6 |
| 4,035,553 | 7/1977 | Evans et al. | 429/104 |
| 4,109,031 | 8/1978 | Marscher | 228/122 X |
| 4,192,911 | 3/1980 | Topouzian | 429/104 |
| 4,197,363 | 4/1980 | Topouzian et al. | 429/104 |
| 4,245,012 | 1/1981 | Mikkor | 429/104 |
| 4,308,323 | 12/1981 | Bowsky | 429/174 X |
| 4,347,295 | 8/1982 | Herczog | 429/193 |
| 4,540,642 | 9/1985 | Kaun | 429/131 |
| 4,687,717 | 8/1987 | Kaun et al. | 429/152 |
| 4,719,159 | 1/1988 | Clark et al. | 429/159 |
| 4,745,033 | 5/1988 | Timmons | 428/547 X |
| 4,795,686 | 1/1989 | Yokoi et al. | 29/623.2 X |
| 4,833,049 | 5/1989 | Teaford et al. | 429/174 X |
| 4,913,982 | 4/1990 | Kotchik et al. | 29/623.3 X |
| 5,015,530 | 5/1991 | Brow et al. | 428/433 |
| 5,021,307 | 6/1991 | Brow et al. | 429/184 |

OTHER PUBLICATIONS

Gibson, H., *Fabrication and Evaluation of Graded Type Ceramic-To-Metal Seals*, Thermionic Conversion Specialist Conference, Oct. 30–Nov. 1, 1967, pp. 253–259.

Horner, M. H. and Giraldez, Emilio, *Seal Fabrication Technique Suggestion*, Memorandum to R. C. Dahlberg, dated Jan. 24, 1992.

Horner, M. H., *Ceramic-To-Metal Seal Opportunity*, Memorandum to James D'Aoust, dated Feb. 21, 1992.

*Primary Examiner*—Stephen Kalafut
*Attorney, Agent, or Firm*—Nydegger & Associates

[57] ABSTRACT

A compact multilayer ceramic-to-metal seal structure, and method for manufacture, includes a ceramic core with opposed metallic surface layers. Between the ceramic core and each of the metallic surface layers is a transition zone which is made from graded layers of metallic and ceramic powders. These layers have progressively greater concentrations of metallic constituents than ceramic constituents the nearer the layer is to the metallic surface layer. Conversely, within the transition zone, the nearer a layer is to the ceramic core, the greater is its concentration of ceramic constituents. This seal is manufactured by simultaneously sintering a multilayer structure of compressed ceramic and metallic powders.

27 Claims, 3 Drawing Sheets

COMPACT MULTILAYER CERAMIC-TO-METAL SEAL STRUCTURE

TECHNICAL FIELD

The present invention pertains generally to metal/ceramic seals. More particularly, the present invention pertains to graded metal/ceramic seals which have a high metal-to-ceramic concentration next to the metal, and which transition from there to a high ceramic-to-metal concentration next to the ceramic. The present invention is particularly, but not exclusively useful, as a seal for insulating the anode current collector of a battery cell from the cell's cathode current collector, and for preventing leakage of the electrolyte from between the anode and the cathode of the cell.

BACKGROUND OF THE INVENTION

Several applications for a compact battery having a high power to energy ratio are apparent. The use for such a battery is of particular interest where space and weight limitations are of paramount importance. Such is the case in the transportation industry, and more specifically in the automotive industry. A bipolar battery, such as a lithium/iron disulfide battery, seems well suited for this application because of its relatively compact configuration.

As is well known to those skilled in the pertinent art, the operation of a chemical battery requires an anode, a cathode and an electrolyte which is positioned between the anode and cathode. Further, it is necessary that the anode current collector of the battery be electrically insulated from the cathode current collector, and that the electrolyte be contained between the anode and cathode. An effective seal must accomplish both of these requirements.

Several factors must be considered in the manufacture of a bipolar battery seal in order for the seal to satisfy the different requirements. First, because the seal must insulate the current collectors from each other, the seal must contain a dielectric material, such as a ceramic or a glass. Second, since the current collectors must be conductive, and are therefore typically made of a metal, the dielectric must somehow be effectively bonded to the metallic current conductors. Third, the seal must be hermetic so that electrolyte between the anode and cathode will not leak from the battery cell.

One approach to the manufacture of a hermetic seal for a bipolar battery involves creating a "graded" transition zone between the ceramic part of the seal and the metallic current collectors. More specifically, graded seals include variously proportioned mixtures of ceramic and metallic constituents in the transition zone. The intent, of course, is to have a greater concentration of ceramic constituents in the transition zone near the ceramic, and a greater concentration of metallic constituents in the transition zone near the metallic conductors. Such structures accommodate the differences in thermal expansion between the ceramic and the metallic constituents. Such an approach was first suggested in U.S. Pat. No. 3,324,543 which issued to C. I. McVey et al for an invention entitled "Pressure Bonded Ceramic-To-Metal Gradient Seals". Others have followed McVey et al. For example, H. Gibson, General Electric Co., presented a paper at the 1967 Thermionic Conversion Specialist Conference in Palo Alto, Calif., entitled "Fabrication and Evaluation of Graded Type Ceramic-To-Metal Seals" wherein a graded seal was considered in detail. The seal disclosed by McVey et al, and evaluated by Gibson, however, required a prefabricated ceramic such as Lucalox ($Al_2O_3$).

The present invention recognizes that graded seals which are manufactured using a prefabricated ceramic are undesirably bulky, unnecessarily more complicated to manufacture, and more expensive. As appreciated by the present invention, the prefabrication of a ceramic core to achieve the required dielectric and hermetic properties of an effective bipolar battery cell can be circumvented.

In light of the above it is an object of the present invention to provide a seal for a bipolar battery which is monolithic and manufacturable with only one sintering operation. Another object of the present invention is to provide a seal for a bipolar battery which will effectively withstand significant temperature differentials during manufacture and operational installation. Yet another object of the present invention is to provide a seal having diminished dimensions for the manufacture of individual battery cells which, when joined together, make a battery having a compact configuration. Still another object of the present invention is to provide a seal for a bipolar battery which can be mass produced. Another object of the present invention is to provide a seal for a bipolar battery which is relatively simple to manufacture and comparatively cost effective.

SUMMARY OF THE INVENTION

A compact bipolar battery cell of the present invention includes an extremely thin metal-ceramic-metal seal which is used to electrically insulate the battery's anode current collector from its cathode current collector. Additionally, the seal is used to establish a hermetic seal that prevents leakage of the battery's electrolyte from between the anode and the cathode. The seal itself is made from layers of powders which are sintered together into a monolithic structure.

In accordance with the present invention, adjacent layers in the seal have different proportions of metallic and ceramic constituents. Specifically, the seal includes a first metallic surface layer which is attachable to the anode current collector and a second metallic surface layer which is attachable to the cathode current collector. These surface layers essentially include only metallic constituents. On the other hand, at the center of the seal between the first surface layer and the second surface layer, is a ceramic core layer which essentially includes only dielectric constituents. Between this ceramic core layer and each of the surface layers is a transitional zone that includes a plurality of transitional segments having various proportions of metallic constituents and metallic oxide constituents.

As implied above, each transitional zone of intermixed metallic and ceramic (i.e. metallic oxides or other insulating compounds or glasses) constituents establishes a proportionally tapered concentration of the constituents across the transitional zone. Preferably, each of the transitional zones will have three or more segments. For purposes of initial discussion, only three segments will be considered. These segments are designated as first, second and third transitional segments. In an alternate embodiment, the possibility for five such segments is considered.

For the three segment transitional zone embodiment of the present invention, the first transitional segment is adjacent the ceramic core layer and has approximately seventy five percent (75%) ceramic or metallic oxide constituents and twenty five percent (25%) metallic constituents. The second transitional segment is adjacent the first transitional segment on the side of the first transitional segment opposite the ceramic core layer. The second transitional segment has approximately fifty percent (50%) ceramic and fifty percent (50%) metallic constituents. The third transitional segment which is between the second transitional segment and the metallic surface layer has metallic/metallic oxide ratios of 25/75, 50/50 and 75/25. It happens that when sintered, the powders that make up the metallic surface layers, the segments in the transitional zone, and the ceramic core layer, meld together with adjacent powders at their respective interfaces. Thus, the transitional zones are effectively tapered by the varied constituents of the transitional segments between the ceramic core layer and the metallic surface layers.

In the manufacture of the seal of the present invention it is first necessary to properly stack or consolidate the powdered constituents in a desired sequence to create a multilayer structure. Next, this multilayer structure is sintered to fabricate the seal, and the seal is then cleaned to be made operationally effective. Within the general parameters of this procedure some variations are contemplated.

For the preferred method of manufacturing the seal of the present invention, the powders which will constitute the various layers and segments of the seal are first separated into size fractions to control shrinkage during subsequent sintering. The powders are then mixed together according to predetermined proportions. Specifically, starting with metallic powders of molybdenum and metallic oxide powders of magnesium oxide, mixed powders are prepared having approximately seventy five percent (75%) metallic constituents and twenty five percent (25%) ceramic constituents. The metallic powders, ceramic powders and mixed powders are then each individually blended with a solvent and, perhaps, a binder. Next, the powders for each segment and layer are separately pressed and pelletized where required. The pelletized powders are subsequently regranulated to predensify the powder.

After being mixed and blended, the powders are separately loaded into a press in a predetermined sequence, and compressed to densify the powder. Exemplary of the press to be used for this process is a press having a plate with an aperture formed into the loading surface of the plate. A platen is slidingly disposed in the aperture of the plate, and is movable therein to be distanced from the loading surface of the plate. Thus, a recess is created in the loading surface of the plate. The press also includes a plunger which is insertable into the recess, after powder has been loaded into the recess, to compress the powders against the platen. Preferably, both the recess and the plunger are annular shaped.

To load powder into the press, the platen is initially positioned in the aperture to establish a desired depth for the recess. The recess is then filled with a selected powder, and the plunger is driven into the recess to compress the powder against the platen. Subsequently, the plunger is withdrawn and, with the previously compressed powder remaining in the recess, the platen is repositioned in the aperture to again establish a desired depth for the recess. The depth is now measured from the exposed surface of the previously compressed powder to the loading surface of the plate. Again, a selected powder is loaded into the recess and compressed as above. This cycle is repeated as necessary until a multilayer structure having the desired constituent layers is created.

For the present invention, the multilayer structure which is created by repeatedly loading the press has a cross section that is transitional between a metallic powder to a ceramic (electrically insulating compound) powder and back to a metallic powder. Preferably, the metallic/ceramic proportions in each layer of the multilayer structure is as follows:

metallic,
75/25 (metallic/ceramic),
50/50 (metallic/ceramic),
25/75 (metallic/ceramic),
ceramic,
75/25 (ceramic/metallic),
50/50 (ceramic/metallic),
25/75 (ceramic/metallic), and
metallic.

After the multilayer structure has been created, it is sintered. As intended for the present invention this sintering is accomplished in the temperature range of between approximately one thousand two hundred and two thousand degrees Centigrade (1200°-2000° C.) for a duration of between approximately one half hour and eight hours (0.5-8 hrs). The sintered seal is then honed and ground to open any shorts that might have developed during manufacture along the edges of the layers in the seal between the metallic surface layers. Honing and grinding is also accomplished to properly size the seal. The metallic surface layers can then be smoothed by a lapping process and the seal tested for leaks. Finally, one of the metallic surface layers is brazed or welded or diffusion bonded to the anode current collector and the other metallic surface layer is brazed or welded or diffusion bonded to the cathode current collector.

In an alternate method for manufacturing the metal-ceramic-metal seal of the present invention, a plurality of flexible tapes are prepared. Each tape includes metallic and ceramic powders in predetermined proportions. These tapes are then cut into predetermined shapes having predetermined dimensions, and the precut portions of these tapes are consolidated to create a multilayer structure similar to the one disclosed above. As before, the multilayer structure is sintered and processed after sintering to manufacture the monolithic hermetic seal of the present invention.

The novel features of this invention, as well as the invention itself, both as to its structure and its operation will be best understood from the accompanying drawings, taken in conjunction with the accompanying description, in which similar reference characters refer to similar parts, and in which:

DESCRIPTION OF PREFERRED EMBODIMENTS

Figure 1:
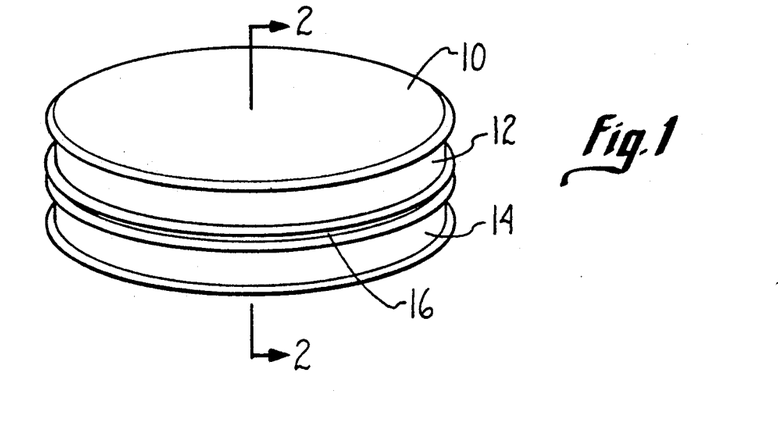
FIG. 1 is a perspective view of a bipolar battery cell incorporating the seal of the present invention.

Referring initially to FIG. 1, a battery cell according to the present invention is shown and designated 10. As shown the cell 10 includes an anode current collector 12 and a cathode current collector 14 which are separated by a seal 16. As intended for the present invention, the cell 10 can be stacked with a plurality of other cells 10 to establish a compact battery which has a high power-to-energy ratio and a low battery volume.

Figure 2:
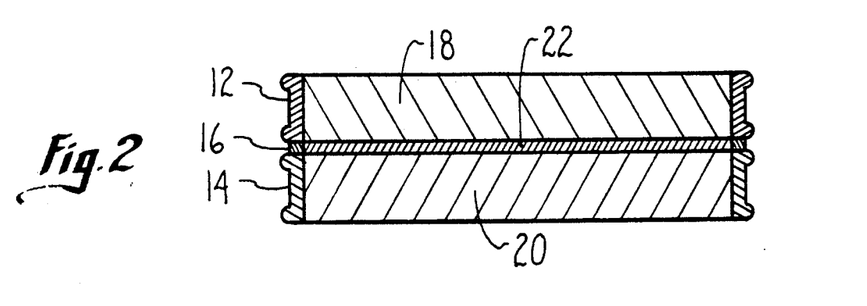
FIG. 2 is a cross-sectional view of the bipolar battery cell as seen along the line 2—2 in FIG. 1.

The operational components of cell 10 will be better appreciated by reference to FIG. 2 wherein it is seen that inside the cell 10 there is an anode 18 and a cathode 20 which are separated from each other by an electrolyte 22. More specifically, anode 18 is electrically connected to anode current collector 12 and cathode 20 is electrically connected to cathode current collector 14. Importantly, seal 16 must be capable of electrically insulating anode current collector 12 from cathode current collector 14. Also, the seal 16 must be hermetic to prevent the leakage of electrolyte 22 from between anode 18 and cathode 20.

For purposes of the present invention, any of several chemical materials, all well known in the pertinent art, can be used for the manufacture of the components of cell 10. Preferably, anode 18 is an iron sulfide (FeS or $FeS_2$), and cathode 20 is a lithium alloy (LiAl or LiSi). Cathode current collector 14 is preferably made of molybdenum (Mo) and the anode current collector 12 is preferably made of either molybdenum (Mo) or iron (Fe). Suitable materials for the anode current collector 12 will include a stainless steel, such as the materials marketed as 304 SS, or an iron iron alloy, such as the material marketed as 1010 steel The electrolyte 22 is preferably made of pressed powder magnesium oxide (MgO) with appropriate salts. Unlike the above-disclosed components for cell 10, which are made of essentially homogeneous materials, seal 16 is a monolithic heterogeneous structure which includes dissimilar materials that will vary in the constituency of the seal 16 through or across the structure. A construction of seal 16 is shown in FIG. 3.

Figure 3:
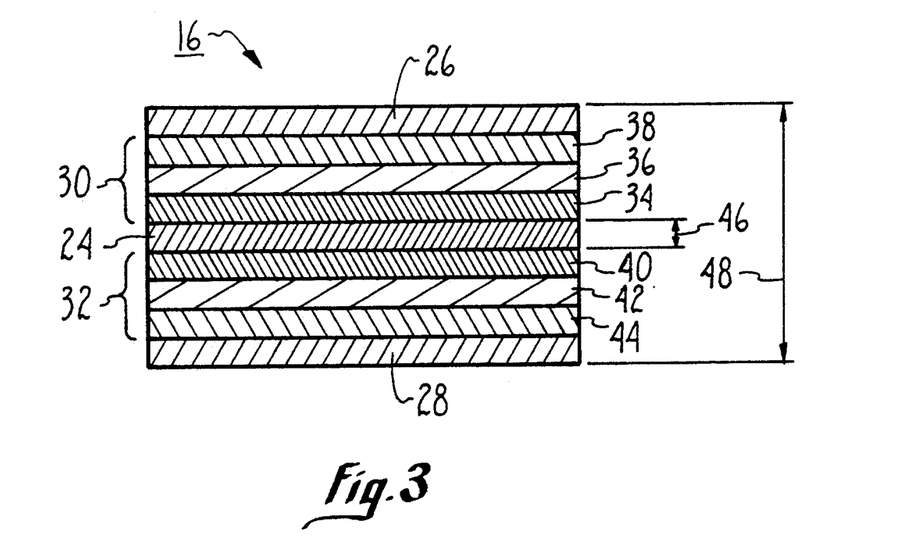
FIG. 3 is an enlarged cross-section view of the seal of the present invention.

In FIG. 3 it is seen that, in accordance with the present invention, a seal 16 includes a ceramic core layer 24 which is located between a metallic surface layer 26 and a metallic surface layer 28. As implied by their respective nomenclature, ceramic core layer 24 is made of a ceramic material, and the metallic surface layers 26 and 28 are made of metal. Preferably, ceramic core 24 is made of a magnesium oxide (MgO). It may, however, be made of any electrically insulating compound which is well known in the pertinent art, such as glass. Further, the metallic surface layers 26 and 28 are made of a metal such as molybdenum (Mo). FIG. 3 also shows that between ceramic core layer 24 and the metallic surface layer 26 is a transition zone 30. Additionally, between ceramic core layer 24 and the metallic surface layer 28 there is a transition zone 32. These transition zones 30,32 each comprise intermixed ceramic and metallic constituents that are the same as the respective unmixed constituents of the core layer 24 and the metallic surface layers 26,28. Consequently, when proportioned as intended for the seal 16 of the present invention, each transition zone 30,32 has a tapered concentration of mixed constituents across the zone 30,32.

As also shown in FIG. 3 for the exemplary seal 16, transition zone 30 includes transition segments 34, 36 and 38, and transition zone 32 includes transition segments 40, 42 and 44. Preferably, the intermixed constituents of these segments 34, 36, 38, 40, 42 and 44 are approximately as follows. The segments 34 and 40, which are adjacent ceramic core 24, will have a greater concentration of ceramic constituents than metallic constituents, and these concentrations will be respectively seventy five percent (75%). and twenty five percent (25%). For the segments 36 and 42 which are respectively adjacent the segments 34 and 40, but on the opposite side thereof from ceramic core 24, the concentrations of ceramic and metallic constituents are about equal, i.e. fifty percent (50%) and fifty percent (50%). Lastly, the segment 38 which is between the segment 36 and metallic surface layer 26, as well as the segment 44 which is between the segment 42 and metallic surface layer 28, will each have a greater concentration of metallic constituents than ceramic constituents. For the segments 38 and 44, the ratio of ceramic to metallic constituents will be about twenty five percent (25%) to seventy five percent (75%).

At this point is to be appreciated that the particular embodiment for seal 16 as shown in FIG. 3 is only exemplary. In fact, it is intended that the transitional zones 30 and 32 can include more than the three segments disclosed above. It happens that additional segments may be effectively included in the transitional zones 30, 32. Such a possibility is to be subsequently discussed.

After the manufacture of seal 16 has been completed, the depth 46 of ceramic core 24 will be in the range of between three to thirty thousandths of an inch (0.003-0.030 in.), and the overall dimension 48 between the outside surfaces of metallic surface layer 26 and metallic surface layer 28 will be less than approximately two tenths of an inch (0.2 in.).

METHOD OF MANUFACTURE

Figure 4:
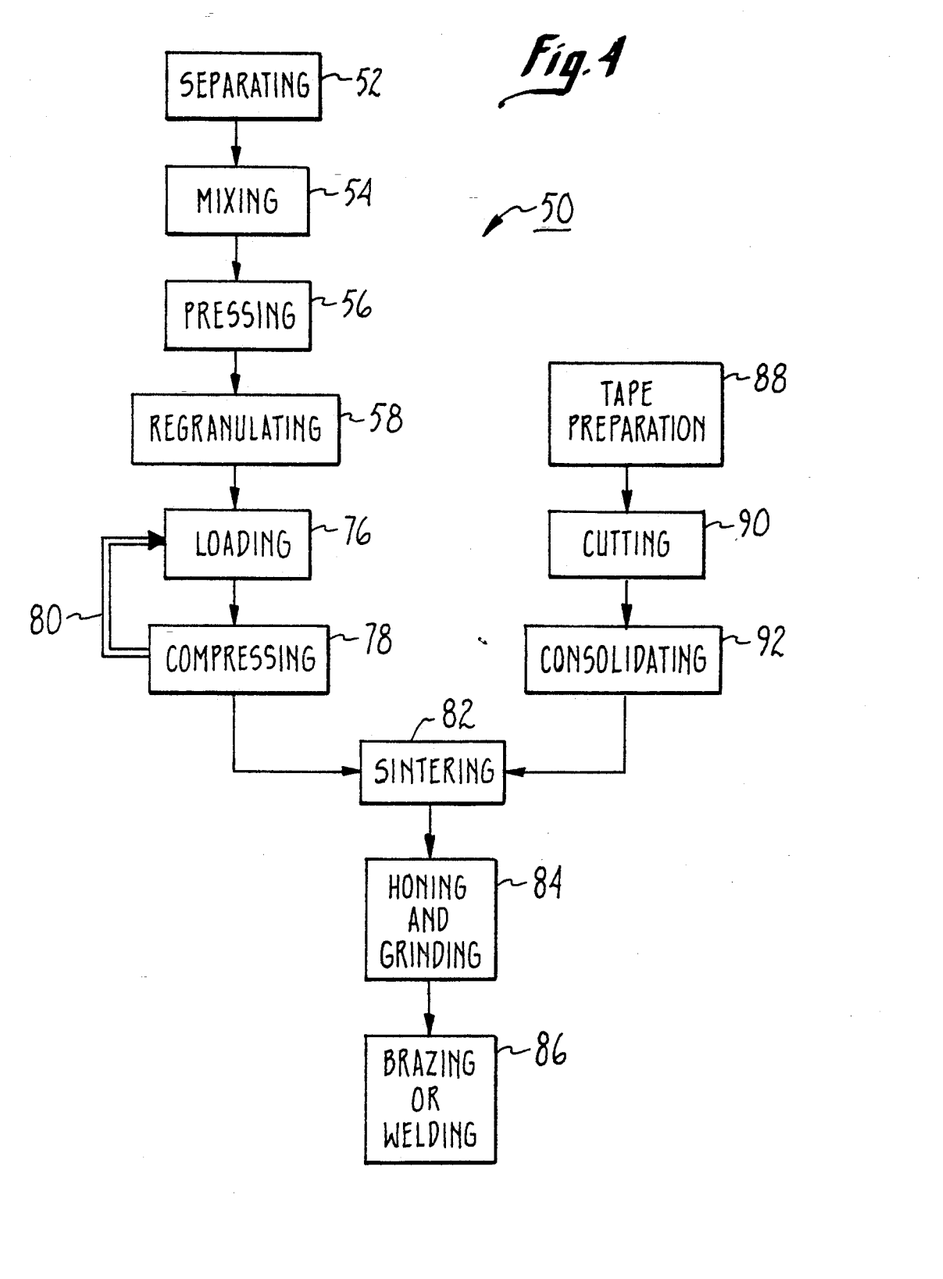
FIG. 4 is a block diagram flow chart of the operational steps in the manufacture of the seal of the present invention.

The method for manufacturing a seal 16, in accordance with the present invention, includes the conceptual steps set forth in the flow chart, generally designated 50, in FIG. 4. To begin this method, ceramic powders (e.g. MgO) and metallic powders (e.g. Mo) are selected and separated, into size fractions, as indicated at block 52. This is done so that shrinkage can be controlled during a subsequent sintering step. Next, a sized selection of some of the powders are mixed together, as indicated by block 54, in the particular proportional concentrations that are desired for the selected segments of transition zones 30,32. Together with this mixing, the pure ceramic powders, the pure metallic powders and the mixed powders are all blended with a binder and a solvent. It is to be appreciated that any solvent or binder which are well known in the pertinent art can be used during the above disclosed steps to facilitate the processing of the powders. A particularly good binder for use in this process is camphor. The powders are then air dried to evaporate the solvent and are crushed to regranulate the powders. If necessary, more uniform grain size, and thus greater control over shrinkage during sintering, can be obtained by an additional regranulation of the powders. To do this, the powders, both pure and mixed, can be pressed into pellets to predensify the powders, as indicated by block 56. The pelletized powders are then regranulated, as indicated by block 58.

Figure 5:
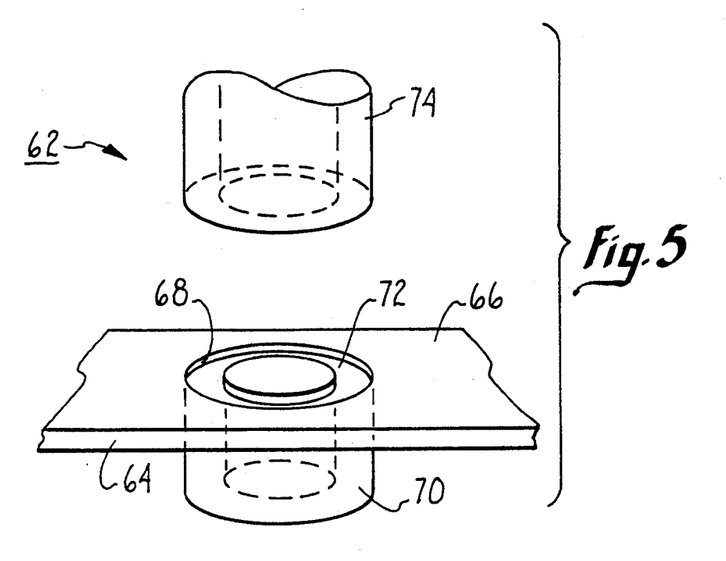
FIG. 5 is a perspective view of the functional components of a press useful for the manufacture of the seal of the present invention.

Reference is now made to FIG. 5 where the functional components of a press, generally designated 62, are shown. For the present invention, press 62 can be of any type press well known in the art which includes a plate 64 with a loading surface 66 that has an aperture 68 formed into the loading surface 66. A platen 70 is slidingly disposed for reciprocal movement in the aperture so that a recess 72 can be established in the plate 64 according to the positioning of the platen 70. Though the aperture 68 and platen 70 are shown to be substantially annular, or ring shaped, in FIG. 5, it is to be appreciated that these components can be of any shape desired by the user. For these particular shapes, however, the recess 72 will be annular, or ring shaped. Consequently, the plunger 74 which is insertable into the recess 72 must have an annular shape.

Returning now to FIG. 4, it is to be understood that the prepared powders are loaded into the recess 72, as indicated by block 76, and then compressed, as indicated by block 78. The line 80 indicates that the loading and compressing steps can be repeated as desired by the user. Specifically, as intended for the present invention, plunger 74 is initially withdrawn into the aperture 68 to establish a recess 72 having a preselected desired depth. A pure metallic powder is then loaded into the recess 72 and compressed at a low pressure between the platen 70 and plunger 74. Note, this operation establishes what will eventually become one of the metallic surface layers 26,28. After compression of the metallic powder, the plunger 74 is withdrawn into aperture 68 to again establish a recess 72 having a preselected desired depth. This time, the recess 72 is established between the loading surface 66 and the previously compressed powders. Next, a mixture of metallic and ceramic powders, which has a proportionally greater concentration of metallic powder than ceramic powder, is loaded into the recess 72. Again, the powders in the recess 72 are compressed between the platen 70 and the plunger 74. The loading and compressing steps are repeated using mixtures of powders which progressively have a decreasing concentration of metallic constituents, and an increasing concentration of ceramic constituents, until a pure ceramic powder is used. This ceramic powder layer, of course, establishes what will eventually become the ceramic core 24. Once the pure ceramic powder has been loaded and compressed, the process is reversed. For the remaining steps, the loading and compressing steps are repeated using mixtures of powders which progressively have a decreasing concentration of ceramic constituents, and an increasing concentration of metallic constituents. This continues until there is again a pure metallic powder layer which will eventually become the other of the metallic surface layers 26,28. At this point, the assembly of layers is compressed at a high pressure to create a monolithic structure.

After the layered powders have been compressed together as disclosed above, the structure is sintered as indicated by block 82. This is done by first placing the structure into a vacuum or an atmosphere of hydrogen or inert gas. The actual sintering is then accomplished in the temperature range of approximately between one thousand two hundred and two thousand degrees Centigrade (1200°-2000° C.) for a duration of between one half hour and eight hours (0.5-8 hrs.). The sintered structure is now effectively seal 16.

Successful sintering will, in part, result from the proper selection and mixing of powders in the initial steps so that all layers sinter at the same rate. This is so because different sintering rates would cause failure stresses in the material which will obviate the efficacy of the seal 16.

Figure 6:
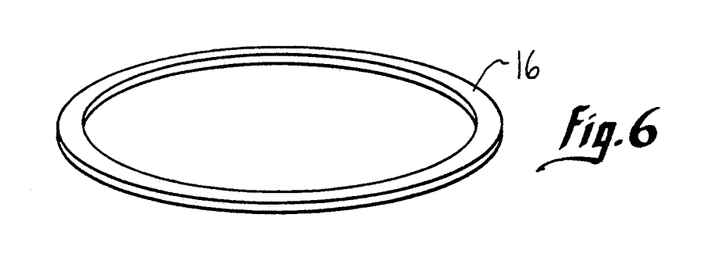
FIG. 6 is a perspective view of the seal of the present invention.

Subsequent to being sintered, seal 16 is honed and ground, as indicated at block 84. This is done along the edges between the metallic surface layers 26,28 to remove any conductive materials which could effectively short the seal 16. Also, the metallic surface layers 26,28 can be lapped to smooth the metallic surface layers 26,28 and facilitate the bonding or joining of the metallic surface layers 26,28 to a respective anode current collector 12 and to a cathode current collector 14. The result is a seal 16 substantially as shown in FIG. 6. This structure is checked for leaks by any of a number of known methods. As implied above, and indicated at block 86, this seal 16 is then attached to the anode current collector 12 and the cathode current collector 14 of a battery cell 10 by any means well known in the pertinent art such as, brazing, welding or diffusion bonding.

In an alternate method for manufacturing the seal 16 of the present invention, a plurality of flexible tapes are prepared, as indicated at block 88. One method for doing this is in accordance with the well known tape casting technique. As prepared, each tape includes a powder having predetermined proportions of metallic and ceramic constituents. Implicitly, one of the tapes will have only metallic constituents, and another only ceramic constituents. More specifically, individual tapes of the plurality will have the same ratioed proportions of metallic and ceramic powders as indicated above for the various powders loaded into the press 62. Here, however, rather than being loading into a press 62, the flexible tapes are cut into predetermined shapes that have predetermined dimensions, as indicated at block 90. In line with the disclosure above, the tapes can be cut into annular or ring shaped layers. All tapes are compounded to have the same sintering rate. These layers of individual tapes having different proportions of metallic and ceramic constituents are then consolidated, at block 92, by being stacked in a desired sequence to create a multilayer structure. This multilayer structure is then sintered, in the same manner as disclosed above for the layers of compressed powders, to create seal 16. As before, seal 16 can be honed, ground and lapped, as necessary, before being attached to the anode current collector 12 and the cathode current collector 14.

After seal 16 is joined to the current collectors 12,14, the resultant structure is checked for leaks. This can be accomplished in any manner well known in the pertinent art, and is important to insure that the seal 16 is hermetic.

Figure 7:
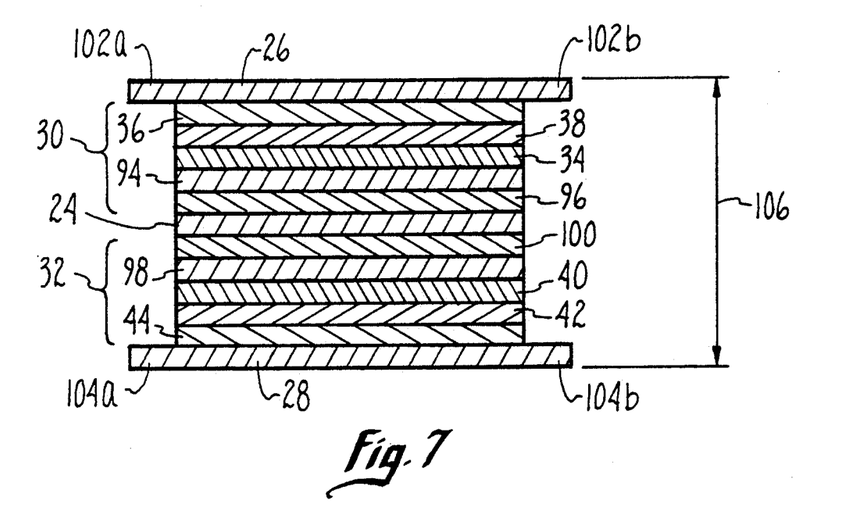
FIG. 7 is a cross sectional view of another embodiment of the seal of the present invention.

In another embodiment of the seal 16, additional segments are added to the transition zones 30,32. Specifically, several segments are added to the transition zones 30,32 near the ceramic core 24 to smooth the transition into the ceramic core 24. Thus, for example, in addition to the segments 34, 36 and 38 disclosed above for transition zone 30, the transition zone 30 can also include segments 94 and 96. Similarly, in addition to the segments 40, 42 and 44 in transition zone 32, the transition zone 32 can also include segments 98 and 100. For these five segment transition zones 30,32, segments 94 and 98 will have twelve percent (12%) metallic constituents and eighty eight percent (88%) ceramic constituents. The segment 96 and 100, which are adjacent the ceramic core 24 will include still greater concentrations of ceramic constituents and will have only six percent (6%) metallic constituents, and ninety four percent (94%) ceramic constituents. Further, it is possible that metallic surface layer 26 is created with lips 102a and 102b, and that metallic surface layer 28 is created with lips 104a and 104b which extend beyond the transition zones 30,32. The intended purpose of this structure is to facilitate the attachment of seal 16 to the anode current collector 12 and the cathode current collector 14. Like the embodiment of seal 16 having three segment transition zones 30,32, the seal 16 with five segment transition zones 30,32 is still dimensionally small. Indeed, the dimension 106 will be less than approximately two tenths of an inch (0.2 in.).

While the particular compact multilayer ceramic-to-metal seal structure as herein shown and disclosed in detail is fully capable of obtaining the objects and providing the advantages herein before stated, it is to be understood that it is are merely illustrative of the presently preferred embodiments of the invention and that no limitations are intended to the details of construction or design herein shown other than as described in the appended claims.

We claim:

1. In a battery cell, a compact monolithic hermetic seal for insulating an anode current collector and attached anode from a cathode current collector and attached cathode, said seal comprising a first metallic surface layer attachable to said anode current collector, a second metallic surface layer attachable to said cathode current collector, a ceramic core layer between said first surface layer and said second surface layer, a first transitional zone between said first surface layer and said ceramic core layer, and a second transitional zone between said second surface layer and said ceramic core layer, each said transitional zone being of intermixed metallic and ceramic constituents having a proportionally tapered concentration of said constituents across said zone, said seal confining an electrolyte between said anode, said cathode and said seal to insulate said anode current collector from said cathode current collector.

2. A seal as recited in claim 1 wherein said first surface layer and said second surface layer are made of molybdenum and said ceramic core layer is made of magnesium oxide.

3. A seal as recited in claim 2 wherein said tapered concentration of constituents is characterized by a diminished proportion of ceramic constituent from said ceramic core, across said first and second transitional zones, to said first and second metallic surface layers.

4. A seal as recited in claim 3 wherein said first and second transitional zones each comprise a plurality of transitional segments with each said transitional segment having a characteristic proportion of ceramic and metallic constituents.

5. A seal as recited in claim 4 wherein each said transitional zone comprises first, second and third transitional segments, said first transitional segment being adjacent said ceramic core layer and comprising approximately seventy five percent (75%) ceramic constituents and twenty five percent (25%) metallic constituents, said third transitional segment being adjacent said metallic surface layer and comprising approximately seventy five percent (75%) metallic constituents and twenty five percent (25%) ceramic constituents, and said second transitional segment being intermediate said first and said third transitional segments and comprising approximately equal parts of ceramic and metallic constituents.

6. A seal as recited in claim 1 wherein said cathode current collector is made of molybdenum and said anode current collector is made of iron.

7. A seal as recited in claim 1 wherein said cathode current collector and said anode current collector are made of molybdenum.

8. A seal as recited in claim 1 wherein said cathode current collector is attached to a lithium alloy cathode and said anode current collector is attached to an iron sulfide anode.

9. A seal as recited in claim 1 wherein the normal distance across said seal between said first surface layer and said second surface layer is less than two tenths of an inch (0.2 in.).

10. A compact bipolar battery cell with a separation of less than two tenths of an inch between the anode current collector and the cathode current collector which comprises:
an anode attached to said anode current collector;
a cathode attached to said cathode current collector;
an electrolyte separating said anode from said cathode;
and
a hermetic seal for confining said electrolyte between said seal, said anode and said cathode and for insulating said anode current collector from said cathode current collector, said seal comprising a first metallic surface layer attachable to said anode current collector, a second metallic surface layer attachable to said cathode current collector, a ceramic core layer intermediate said first surface layer and said second surface layer, a first transitional zone between said first surface layer and said ceramic core layer, and a second transitional zone between said second surface layer and said ceramic core layer, each said transitional zone being of intermixed metallic and ceramic constituents having a proportionally tapered concentration of said constituents across said zone.

11. A bipolar battery cell as recited in claim 10 wherein said first surface layer and said second surface layer are made of molybdenum and said ceramic core layer is made of magnesium oxide, and wherein said first and second transitional zones each comprise first, second and third transitional segments, said first transitional segment being adjacent said ceramic core layer and comprising approximately seventy five percent (75%) ceramic constituents and twenty five percent (25%) metallic constituents, said third transitional segment being adjacent said metallic surface layer and comprising approximately seventy five percent (75%) metallic constituents and twenty five percent (25%) ceramic constituents, and said second transitional segment being intermediate said first and said third transitional segments and comprising approximately equal parts of ceramic and metallic constituents.

12. A bipolar battery cell as recited in claim 10 wherein said cathode current collector and said anode current collector are made of molybdenum and wherein said cathode current collector is attached to a lithium alloy cathode and said anode current collector is attached to an iron sulfide anode.

13. A bipolar battery cell as recited in claim 10 wherein said seal is flat and is washer-shaped.

14. A bipolar battery cell as recited in claim 10 wherein said first metallic surface layer of said seal is brazed to said anode current collector and said second metallic surface layer is brazed to said cathode current collector.

15. A bipolar battery cell as recited in claim 10 wherein said first metallic surface layer includes a protruding extension for welding said first surface layer to said anode current collector and said second metallic surface layer includes a protruding extension for welding said second surface layer to said cathode current collector.

16. A method for manufacturing a battery cell having a monolithic seal for insulating an anode current collector with attached anode from a cathode current collector with attached cathode which comprises the steps of:
   A) blending a plurality of powders, each of said powders having selected proportions of a metallic constituent and a ceramic oxide constituent;
   B) loading a selected said powder into the recess of a press, said press comprising a plate having a loading surface and formed with an aperture in said loading surface, a platen slidingly positionable in said aperture for distancing said platen from said loading surface to establish said recess, and a plunger insertable into said recess;
   C) compressing said powder in said recess between said platen and said plunger;
   D) withdrawing said platen from said loading surface to reconfigure said recess;
   E) repeating steps B), C) and D) in sequence as desired;
   F) sintering said compressed powders to create said seal having a first metallic surface layer attachable to said anode current collector, a second metallic surface layer attachable to said cathode current collector, a ceramic core layer intermediate said first surface layer and said second surface layer, a first transitional zone between said first surface layer and said ceramic core layer, and a second transitional zone between said second surface layer and said ceramic core layer, each said transitional zone being of intermixed metallic and ceramic constituents having a proportionally tapered concentration of said constituents across said zone; and
   G) attaching said first metallic surface layer of said seal to said anode current collector and said second metallic surface layer to said cathode current collector to confine an electrolyte between said seal, said anode and said cathode to create said battery cell.

17. A method as recited in claim 16 further comprising the step of initially separating said powders according to size fractions to control shrinkage during said sintering step.

18. A method as recited in claim 16 wherein said blending step further comprises the steps of:
   mixing said powders with a solvent;
   pressing said powders to pelletize said powders; and
   regranulating said pelletized powders to predensify said powder.

19. A method as recited in claim 16 wherein said sintering step is accomplished in a hydrogen atmosphere.

20. A method as recited in claim 19 wherein said sintering step is accomplished in the temperature range of between one thousand two hundred and two thousand degrees Centigrade (1200°-2000° C.) for a duration of between one half hour and eight hours (0.5-8 hrs).

21. A method as recited in claim 16 wherein said loading steps are accomplished in a sequence which beings with a powder having only metallic constituents and followed, in order, with powders having selected proportions of both metallic and ceramic constituents, a powder having only ceramic constituents, powders having selected proportions of both metallic and ceramic oxide constituents, and, finally, a powder having only metallic constituents.

22. A method as recited in claim 21 further comprising the steps of honing and grinding said seal between said first metallic surface layer and said second metallic surface layer to open any shorts therebetween and to size said seal.

23. A method for manufacturing a battery cell having a monolithic seal for insulating an anode current collector with attached anode, from a cathode current collector with attached cathode, which comprises the steps of:
   A) preparing a plurality of flexible tapes, each of said tapes including a powder having selected proportions of a metallic constituent and a metallic oxide constituent;
   B) cutting said flexible tapes into substantially annular shapes;
   C) consolidating said precut flexible tapes to create a multilayer structure;
   D) sintering said consolidated multilayer structure to create said seal, said seal having a first metallic surface layer attachable to said anode current collector, a second metallic surface layer attachable to said cathode current collector, a ceramic core layer intermediate said first surface layer and said second surface layer, a first transitional zone between said first surface layer and said ceramic core layer, and a second transitional zone between said second surface layer and said ceramic core layer, each said transitional zone being of intermixed metallic and ceramic constituents having a proportionally tapered concentration of said constituents across said zone; and
   E) attaching said first metallic surface layer of said seal to said anode current collector and said second metallic surface layer to said cathode current collector to confine an electrolyte between said seal, said anode and said cathode to create said battery cell.

24. A method as recited in claim 23 wherein said sintering step is accomplished in a hydrogen atmosphere and is accomplished in the temperature range of between one thousand six hundred and fifty and two thousand degrees Centigrade (1650°-2000° C.) for a duration of between one half hour and three hours (0.5-3 hrs).

25. A method as recited in claim 23 wherein said consolidating step is accomplished by stacking said precut flexible tapes in a sequence which begins with a tape having a powder with only metallic constituents and is followed, in order, with precut flexible tapes having powders with predetermined proportions of both metallic and ceramic constituents, with a powder having only ceramic constituents, with powders having predetermined proportions of both metallic and ceramic constituents, and, finally, with a powder having only metallic constituents.

26. A method as recited in claim 23 further comprising the steps of honing and grinding said seal between said first metallic surface layer and said second metallic surface layer to open any shorts therebetween and to size said seal.

27. A method as recited in claim 26 further comprising the steps of brazing said first metallic surface layer of said seal to said anode current collector and said second metallic surface layer to said cathode current collector.

* * * * *